United States Patent Office 2,821,210
Patented Jan. 28, 1958

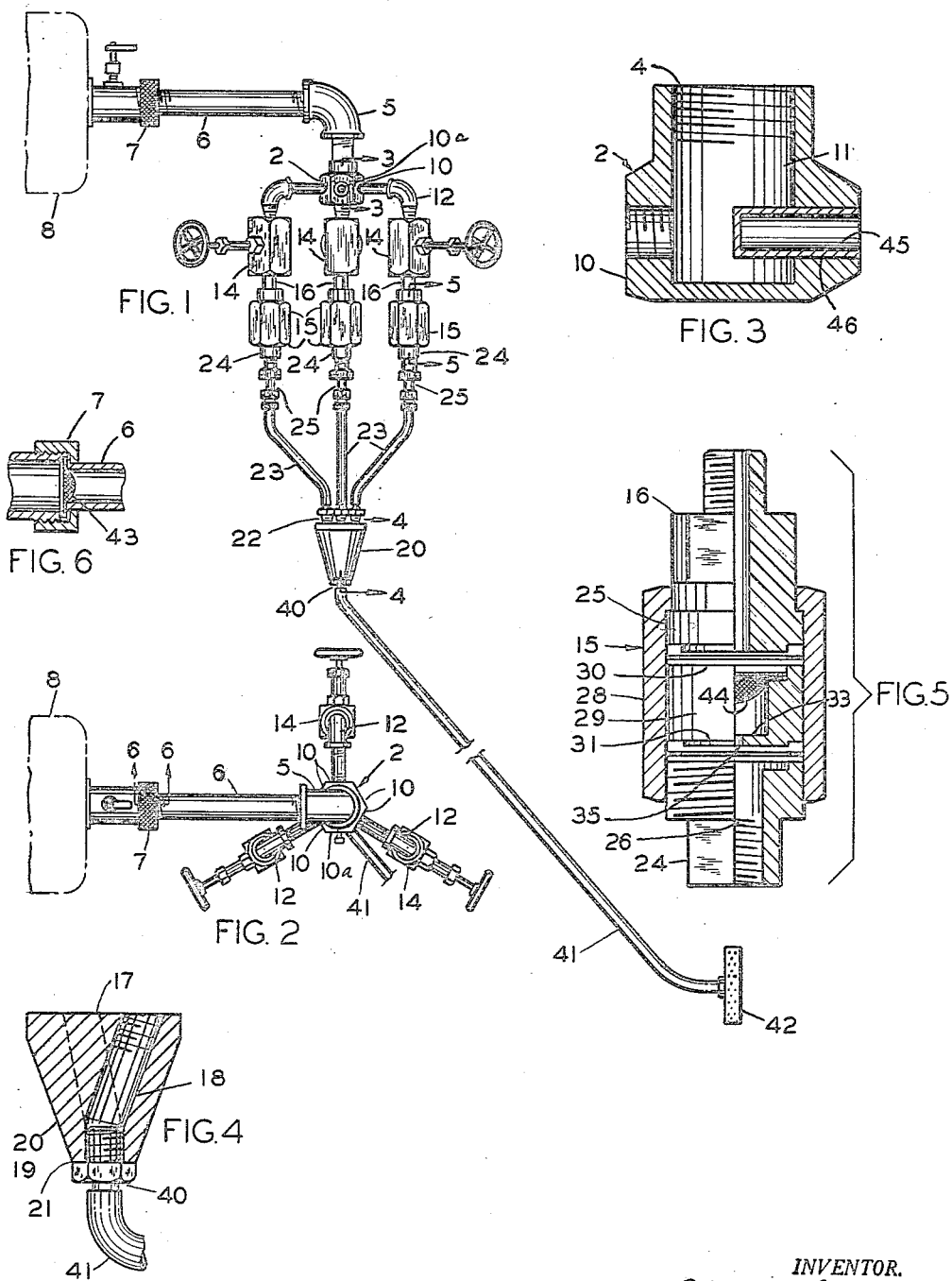

2,821,210

MULTIPLE ORIFICE METERING MECHANISM FOR ANHYDROUS AMMONIA

Otis M. Liley, Phoenix, Ariz.

Application August 15, 1955, Serial No. 528,412

2 Claims. (Cl. 137—599)

This invention concerns improvements in multiple orifice valves for metering anhydrous ammonia used in irrigation water for fertilizer.

Heretofore, when dry ammonia gas was to be delivered to irrigation water, for fertilizing purposes, the delivery tank was placed near the irrigation ditch head and connected to a single orifice holder in which an orifice of predetermined size was placed. The size of this orfiice was determined by the temperature of the gas in the tank and by the amount of water to be applied to the field and the length of time the water was to be run. I have found that, under such conditions, the temperature of the tank often changed during the irrigation period and the orifice used might be either too large or too small to supply the gas to the irrigation water during the proposed run. In such a case the flow of gas would have to be shut off, the orifice holder opened, and another orifice of suitable size placed in the container, and then the tank valve reopened. Such adjustments can only properly be made by trained personnel of the ammonia sales organization, and it has been found that the farmer or his employees should not be allowed to change orifices or manipulate valves on the ammonia pressure tanks. When it was found that the orifice was not of proper size the only thing the farmer could do would be to call a service operator of the ammonia gas sales organization. This procedure made delay and unnecessary trips on the part of the ammonia gas service operator and often wasted gas.

The word "orifice" as herein used refers to a cylindrical thimble having a central web perforated by an orifice of predetermined size.

In view of the foregoing I have devised a multiple orifice metering device which includes a manifold adapted to connect at the inlet end to the ammonia tank and having a plurality of outlets, each controlled by a separate valve, while each valve is connected to an orifice holder containing an orifice of predetermined size. Each of these orifices has a predetermined flow rate, and by opening any one of or several of the valves, the flow rate may be varied without danger by anyone interested in the irrigation. Thus, the farmer or irrigator may change the rate of flow of the ammonia gas, during the irrigation period, as may be necessary or desirable; accordingly, one of the objects of the invention is to provide a device which can be quickly and easily attached to tanks of compressed ammonia gas which are delivered near the field to be irrigated and fertilized, and will provide a plurality of orifices through which the gas may be released, and thereby metered, as it flows from the tank to the distributing head.

Another object is to provide a manifold having an axially extending nipple, adapted to be connected to the outlet fitting of an ammonia tank, and a plurality of radially extending L fittings which connect to individual valves each of which is connected to orifice holders; said orifice holders being connected at the outlet side to a common receiver or junction fitting by which the flow from any and all orifices is joined, and which fitting has a single outlet adapted to connect to a delivery hose which is, in turn, connected to a distributing manifold, adapted to release the ammonia gas beneath the surface of the irrigation water.

I attain the foregoing objects by means of the devices, parts, and combinations of parts illustrated in the accompanying drawing in which—

Figure 1 is a side elevation of my multiple orifice metering device;

Figure 2 is a plan view thereof;

Figure 3 is a mid-sectional elevational view of the manifold head, drawn on an enlarged scale: taken on line 3—3 of Figure 1;

Figure 4 is a vertical mid sectional view of the multiple junction fitting, taken on line 4—4, Figure 1, drawn on an enlarged scale;

Figure 5 is a vertical multi-sectional view of an orifice holder and orifice, taken substantially on line 5—5, Figure 1, and drawn on an enlarged scale; and Figure 6 is a mid-sectional view of the entrance end of the manifold pipe.

Similar numerals refer to similar parts in the several views.

In the drawings 2 indicates the manifold body. This is hollow and has an opening 4 at the top which is threaded and receives a nipple and L fitting 5. This fitting is connected to a horizontally extending manifold entrance pipe 6. The outer end of this pipe is provided with a standard attaching nut 7, adapted to connect onto the outlet valve boss of an ammonia tank 8.

The body 2 of the manifold is made partially prismatic and symmetrical relative to its vertical axis. In the example shown its perimeter has six vertical flats 10. Therefore, it may be understood to have the general shape of a hexagonal prism. Alternate flats are drilled into the interior cavity 11 of the manifold and threaded to receive nipples and L's 12. Each of these is connected to a bar stock high pressure valve 14. Each valve is arranged so that its valve plug closes against the inlet pressure from the tank. The outlet side of each of these valves is connected to the upper or inlet nipple 16 of an orifice holder 15.

An intermediate flat 10a is drilled and fitted with a tube 44, closed at the bottom and forming a thermo well 45.

The junction fitting 20 has an outside shape similar to an inverted cone. The upwardly extending base 17 is drilled to provide three holes 18 each connecting with axial bore 19 which extends equally annularly spaced upward from the docked apex 21. Each of holes 18 is threaded to receive a nipple 22 adapted to attach to a flexible hose 23.

The lower or outlet boss 24 of each orifice holder 15 is connected by means of a nipple 25 to the upper end of each of the hoses 23. Each orifice holder consists of a lower internally threaded boss 24, an upper inlet boss 26 having an annular nut retaining rim 25 and a threaded hexagonal connector nut 28 which screws onto the boss 24. It is to be understood that these holders each receive and contain a standard orifice thimble 29, shown in Figure 5. These standard orifice thimbles are cylindrical and are bored out somewhat at each end leaving contacting rims 30 and 31 having smooth end faces. The web 33 remaining between these end portions is drilled accurately to form the metering orifice 35. These orifice thimbles are usually standard in size and are well known to the art. No invention is claimed as to their structure nor in the holders in which they are contained.

The holders 15 comprise a convenient means for installing three different standard orifice thimbles having orifices of different predetermined sizes.

At the base of the conical shaped junction fitting 20 there is a nipple 40 adapted to receive the distributing hose 41. This hose is led to a distributing manifold 42 which contains the usual outlet holes for releasing the ammonia gas beneath the surface of the irrigation water.

In use, the nut 7 at the inlet end of the manifold 2 is connected to an ammonia supply tank 8. The outlet distributing hose 41 with its distributing manifold 42 is placed in the irrigation ditch water. The temperature of the ammonia tank is then taken by placing a thermometer in the radial thermo well 45. In taking the temperature a few drops of oil are placed in the well to assure thermal contact and a thermometer is then inserted. One of the valves 14 is then opened so that ammonia gas will flow from the tank 8 to the outlet 42 at a rate which will dissolve all the gas in the irrigation water during the period of the irrigation run. The valve selected is the one connected to the orifice holder which contains an orifice thimble with an orifice which will permit the rate of flow desired. Under ideal conditions this rate will continue substantially the same throughout the irrigation run as long as liquid ammonia remains in tank 8. However, if the demand for gas changes during the period of the run either additional valves may be opened to permit an additional flow of gas or the original valve may be closed and a different valve opened so that its attached orifice will release the desired flow. The tank valve need not be changed. The three valves 14 and their respectively connected orifices permit a wide variation of flow. Usually three orifices will give all the variations of flow desired. However, if more variations of flow are needed manifold 2 may be provided with four or more outlets and these may be connected through valves, such as 14 and these valves to corresponding orifice holders 15.

Where orifice thimbles are to be changed, the holders 15 are opened—the structure being similar to a union—and the new thimbles installed. The tubes 23 are sufficiently flexible to permit operation.

To protect the orifices from particles of scale and the like I provide a main screen 43 in the end of pipe 6 and within nut 7, and special strainers 44 within the inlet end of each orifice thimble.

I claim:

1. In a multiple orifice valve mechanism for metering the flow of anhydrous ammonia from a pressure tank into irrigation water, a manifold having an interior cavity, an entrance pipe adapted for attachment to the outlet of an anhydrous ammonia storage tank opening into said cavity, and a plurality of outlet openings connected to L fittings, in combination with valves connected to said L's, orifice holders having inlet nipples connected to said valves, and outlet bosses, flexible hoses connected to said outlet bosses, orifice thimbles between said inlet nipples and outlet bosses, and a connector nut holding said bosses onto said orifice thimbles, and a junction fitting attached to said hoses and joining them to a distribution hose, adapted to release ammonia gas into irrigation water; said manifold having a thermo well adapted to receive a thermometer to determine the temperature of ammonia gas within said manifold cavity.

2. In a multiple orifice valve mechanism for metering a flow of anhydrous ammonia from a pressure storage tank into irrigation water at a predetermined rate, a manifold having a partially prismatically shaped body with a plurality of flat faces symmetrically arranged relative to its axis, a threaded inlet opening into an interior cavity and threaded openings in the flat faces opening radially into said cavity, an entrance pipe screwed into said inlet opening and extending horizontally to an inlet attaching nut adapted to connect onto an outlet boss of an ammonia storage tank, and L fittings screwed into said radial openings in combination with high pressure stop valves connected to said L fittings, orifice holders having inlet and outlet ends containing orifice thimbles with orifices of predetermined size having their inlet ends connected to said stop valves, flexible hoses connected to the outlet ends of said orifice holders, a junction fitting having a body with an upper face with threaded inlet holes provided with nipples connected to the lower ends of said flexible hoses, and an outlet opening in its lower portion joining said inlet holes and connected to an outlet distribution hose having a perforated manifold at its outer end adapted to release ammonia gas beneath the surface of irrigation water; said prismatically shaped manifold body having a tube with a closed end extending radially into the cavity in its body, providing a thermo well adapted to hold a thermometer for indicating the temperature of ammonia gas within said cavity.

References Cited in the file of this patent

UNITED STATES PATENTS

| | | |
|---|---|---|
| 899,201 | Braybrook | Sept. 22, 1908 |
| 1,436,417 | Trumble | Nov. 21, 1922 |
| 2,038,511 | Kortland | Apr. 21, 1936 |
| 2,148,414 | Wolfert | Feb. 21, 1939 |
| 2,150,077 | Oehler | Mar. 7, 1939 |
| 2,163,591 | Deverall | June 27, 1939 |
| 2,241,197 | Gift | May 6, 1941 |
| 2,413,584 | Side | Dec. 31, 1946 |
| 2,685,151 | Rush | Aug. 3, 1954 |